US008571906B2

(12) United States Patent
Upadhyaya et al.

(10) Patent No.: US 8,571,906 B2
(45) Date of Patent: Oct. 29, 2013

(54) MONITORING THE PROGRESS OF A TASK SET WITHIN A HIERARCHY

(75) Inventors: Anadi Upadhyaya, Hyderabad (IN); Ty Hayden, Grand Junction, CO (US)

(73) Assignee: Oracle International Corporation, Redwood Shores, CA (US)

( * ) Notice: Subject to any disclaimer, the term of this patent is extended or adjusted under 35 U.S.C. 154(b) by 698 days.

(21) Appl. No.: 12/431,027

(22) Filed: Apr. 28, 2009

(65) Prior Publication Data

US 2010/0274620 A1    Oct. 28, 2010

(51) Int. Cl.
*G06Q 40/00* (2012.01)
(52) U.S. Cl.
USPC .......................... 705/7.11; 705/7.42
(58) Field of Classification Search
USPC ............................. 705/9, 7.11–7.42
See application file for complete search history.

(56) References Cited

U.S. PATENT DOCUMENTS

| | | | | |
|---|---|---|---|---|
| 6,101,481 A * | 8/2000 | Miller | | 705/7.13 |
| 6,675,127 B2 * | 1/2004 | LaBlanc et al. | | 702/181 |
| 7,155,400 B1 * | 12/2006 | Jilk et al. | | 705/7.14 |
| 7,155,700 B1 * | 12/2006 | Sadhu et al. | | 717/103 |
| 7,330,822 B1 * | 2/2008 | Robson et al. | | 705/7.15 |
| 7,406,432 B1 * | 7/2008 | Motoyama | | 705/7.16 |
| 7,668,800 B2 * | 2/2010 | Motoyama et al. | | 707/999.001 |
| 7,774,742 B2 * | 8/2010 | Gupta et al. | | 717/101 |
| 2003/0236692 A1 * | 12/2003 | Hertel-Szabadi | | 705/9 |
| 2006/0053043 A1 * | 3/2006 | Clarke | | 705/8 |
| 2007/0150327 A1 * | 6/2007 | Dromgold | | 705/8 |
| 2010/0121685 A1 * | 5/2010 | Mahadevan et al. | | 705/11 |

* cited by examiner

*Primary Examiner* — Thomas Dixon
*Assistant Examiner* — Benjamin S Fields
(74) *Attorney, Agent, or Firm* — Miles & Stockbridge P.C.

(57) ABSTRACT

A system for monitoring a flow of related tasks by supervisors of an organization stores information that defines a hierarchy within an enterprise, the hierarchy including a tree structure where each of a plurality of supervisors is placed in a supervisory position over one or more subordinates and each supervisor is sub ordinate to at most one other supervisor. The system also assigns a task for each of the plurality of supervisors to perform, wherein performing the task by a first supervisor depends in part on completion of the task by each of the one or more respective subordinates. The system also determines if one or more subordinates are causing a delay in the progress towards completion of the task within the hierarchy. The system further generates a report identifying the subordinates, if any, who are causing a delay in the task completion progress.

20 Claims, 6 Drawing Sheets

MONITORING THE PROGRESS OF A TASK SET WITHIN A HIERARCHY

TECHNICAL FIELD

The present disclosure generally relates to related tasks performed by a number of supervisors within a hierarchy of an organization. More particularly, the embodiments described herein relate to systems and methods for monitoring how the task flow progresses through the hierarchy.

BACKGROUND

Many organizations are structured with a hierarchy that defines various levels of management. At times, the supervisors within the organizations are required to perform company-wide evaluations, reviews, requests, appraisals, or other types of tasks. The information for completing such a task at one level in the hierarchy oftentimes relies on information that must be passed up or the down the hierarchy for a particular supervisor to be able to complete his or her task.

For example, for a compensation review, in which a supervisor reviews the compensation rewards for the employees who are subordinate to the supervisor, the supervisor may be required to perform certain tasks on a periodic basis to ensure that his or her subordinates receive their earned salaries, salary increases, bonuses, etc. The compensation review, for example, may involve evaluating, for each subordinate, the employee's time of service in the company, employee's performance evaluations, overtime hours, and/or other factors. Once the supervisor completes the task of the compensation review, or other type of review, evaluation, etc., the supervisor may be required to submit the results to a higher level supervisor, who may then approve or disapprove the completed review.

If an organization has hundreds or even thousands of supervisors within multiple levels of a hierarchy, it can be difficult to manage the completion of a set of related tasks. However, monitoring the progress of such task sets can be an important aspect of the organization, particular regarding approval of compensation information.

SUMMARY

The present disclosure describes several embodiments of systems, methods, and processing logic for monitoring the progression of a set of related tasks. Regarding one particular embodiment, a computer readable medium is configured to store instructions that are executable by a processing device. The computer readable medium includes logic adapted to store information that defines a hierarchy within an enterprise, the hierarchy including a tree structure where each of a plurality of supervisors is placed in a supervisory position over one or more subordinates and each supervisor is subordinate to at most one other supervisor. The computer readable medium also includes logic adapted to assign a task for each of the plurality of supervisors to perform, wherein performing the task by a first supervisor depends in part on completion of the task by each of the one or more respective subordinates. The computer readable medium also includes logic adapted to determine if one or more subordinates are causing a delay in the progress towards completion of the task within the hierarchy. Also, the computer readable medium includes logic adapted to generate a report identifying the subordinates, if any, who are causing a delay in the task completion progress.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

FIG. 7 is a diagram of a screen shot showing status details according to one embodiment.

FIG. 8 is a diagram illustrating a user interface for enabling a user to filter status details according to one embodiment.

DETAILED DESCRIPTION

An organization may be established with any number of supervisors or managers arranged with any chain of command configuration. One hierarchy structure may include a hierarchy that might be recorded in a human resources system for defining the supervisors and corresponding subordinates throughout the organization. This hierarchical tree can be used to define who reports to whom, the number of subordinates that each manager supervises, etc.

Often, the supervisors of an organization are responsible for completing a number of related tasks that may include all the employees of the organization. In other examples, a segment of the supervisory population may be responsible for completing another type of task set, which may apply to only certain departments, depending on the type of tasks being performed. Regardless of the scope of the task set, hierarchical information can be set up for defining which managers are responsible for completing which tasks. Also, some supervisors may need to wait for completion of a task by one or more other supervisors before he or she can complete his or her own task. Because of this dependency on others, one or more person can cause a traffic jam, or delay, in the progression toward completion of the task set for the entire group of supervisors.

Reasons for a delay may not necessarily be critical to an administrator or executive of the organization, just as long as the required tasks are eventually completed. Nonetheless, some reasons for delay may include, for example, a manager being out of the office, out of town, or on vacation. Or maybe the manager has not been properly informed or notified of the task, its deadline, etc. In other instances, the manager may have forgotten to complete the task, did not have the necessary information to complete the task, did not have the necessary access authorization for retrieving needed information, etc. Also, the delay may be caused by a manager simply being busy working on other things.

Regardless of the reasons for a delay, some task sets may be very important for the proper operation of an organization. For example, with regard to employee's compensation (salary, bonuses, etc.), a delay in receipt of an expected pay raise or bonus would not be acceptable to many employees. Therefore, it should be understood that it would be desirable for an organization to enable the managers, supervisors, executives, administrators, etc. to monitor or track the progress towards the completion of a task set by the supervisors within the hierarchy of the organization.

Figure 1:
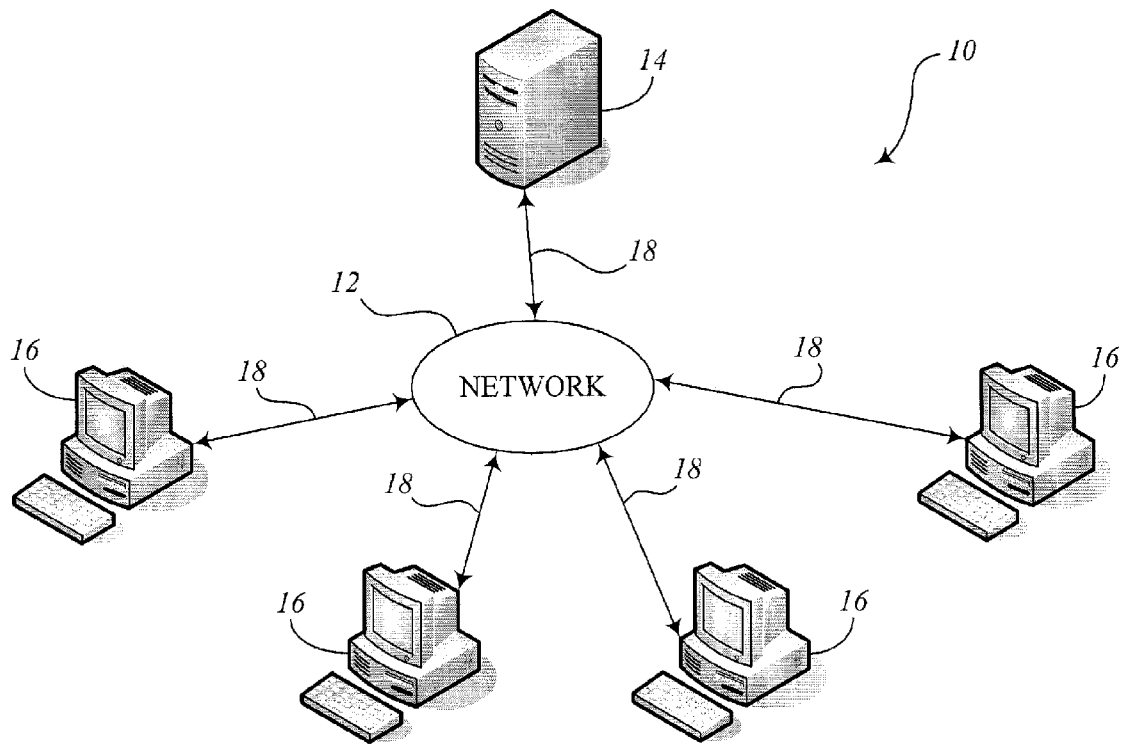
FIG. 1 is a diagram illustrating a task flow monitoring system according to one embodiment.

FIG. 1 is a diagram illustrating an embodiment of a task flow monitoring system 10. Task flow monitoring system 10 is configured to track the progress of a set of related tasks to be performed by a number of employees, e.g., managers or supervisors, within the hierarchy of an organization, company, enterprise, or other group. More particular, the set of tasks in this embodiment are hierarchically dependent. In other words, one supervisor has to wait for completion of a task by someone immediately above or below that supervisor before the supervisor can perform his or her task.

In this embodiment, task flow monitoring system 10 includes a network 12 for enabling communication among a server 14 and end-user devices 16 via communication channels 18. Network 12 and communication channels 18 may include any suitable combination of switches, relays, transmission lines, wireless communication channels, etc., for allowing data and information to be exchanged. In some embodiments, task flow monitoring system 10 forms part of a network of an enterprise, business, corporation, organization, or other group. Network 12 can be a local area network (LAN), wide area network (WAN), or any suitable network for allowing communication among a group of related entities.

Server 14 and end-user devices 16 may be configured as computing systems, such as computers, data processing systems, or other suitable electronic devices for executing logic instructions, e.g., software applications. Processing devices may be incorporated within server 14 and/or end-user devices 16 for controlling the functions of the respective devices. The processing devices may be general-purpose or specific-purpose processors or microcontrollers.

In particular, task flow monitoring system 10 is configured to track the progress of certain tasks that are to be performed by a plurality of employees of an enterprise. In some cases, the enterprise may have a policy that the certain tasks are to be completed within a certain timeframe. Specifically, the tasks can be substantially the same for each employee, and may include, for example, a compensation review, employee leave approval, expense approval, purchase approval, employee review, performance review, promotion request review, assessment review, allocation approval, efficiency review, goal setting approval, or any other type of task, review, approval process, assessment, report, appraisal, etc.

With particular emphasis on the embodiments described in the present invention, the tasks to be performed are hierarchically dependent. In other words, in order for the task to be performed by a particular employee, the task would normally need to be completed by the employees in a hierarchically adjacent or next level with respect to the particular employee. Also, the task would need to be completed by those employees in the direct chain of command as the particular employee. For instance, if a task is upward dependent, then a supervisor must wait for completion of the task by the supervisor's subordinates before the supervisor can perform his task. In this case, information resulting from the specific task is passed up the hierarchy to the next level, allowing the next supervisor or manager to perform the task. On the other hand, a task can alternatively be defined as downward dependent, which means that a subordinate cannot perform his or her specific task until his or her supervisor has completed the respective task.

In some embodiments, server 14 is configured to store information regarding the hierarchy of an enterprise. The hierarchy information includes a tree structure that defines the particular chains of command or relationships of the employees of the enterprise. This information therefore shows the levels of the hierarchy as well as who reports to whom. In some embodiments, an enterprise may have more than one hierarchical structure, where each structure is dedicated to the completion of a certain task set.

Server 14 can also store contact information, including, for example, work phone numbers and e-mail addresses of the supervisors, or managers, of the enterprise. Hence, when a manager is not performing the respective task in a timely fashion and thereby delaying others from performing their tasks, then that manager can be notified, in order to inform the delaying manager that a task needs to be completed within a certain timeframe, that there is a delay, or some other similar message. In some embodiments, this notification to the delaying manager can be made automatically.

Server 14 may also be configured to enable a user to assign the set of tasks to each of the responsible supervisors. The assignment may simply be an e-mail informing the supervisors that the particular task should be performed and should be completed by a particular due date or time. Server 14 can also be configured to determine the status of each task by each supervisor and a supervisor's access level. Also, server 14 can determine those supervisors who may be causing a delay and automatically send a message to inform the delaying supervisors of the delay. In other embodiments, server 14 may provide a report showing the delaying supervisors in order that a supervisor over the delaying supervisors can contact the delayers.

Server 14 and/or end-user device 16 may be used by each respective supervisor to perform the specific task, display reports of the status of the progress toward completion of the tasks, etc. It should be understood that some or all of the functionality of server 14 as described in the present disclosure can be performed by one or more of end-user devices 16. Likewise, some or all of the functionality of end-user device 16 as describe herein can be performed by server 14. Furthermore, some functionality can be performed on both server 14 and end-user device 16 according to the particular design.

Figure 2:
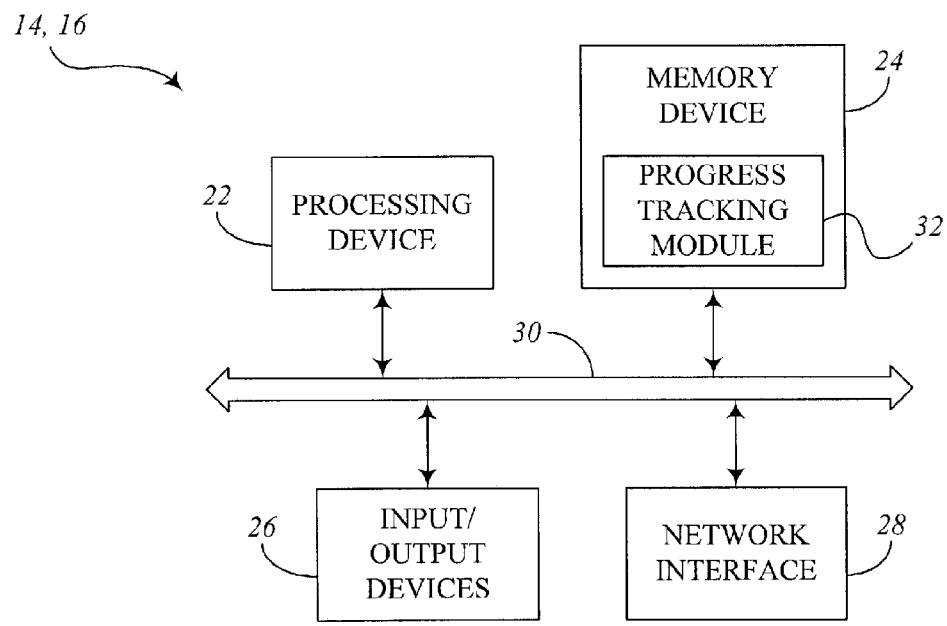
FIG. 2 is a block diagram illustrating the server or one of the end-user devices shown in FIG. 1, according to one embodiment.

FIG. 2 is a block diagram illustrating an embodiment of server 14 (or one of the end-user devices 16) shown in FIG. 1, according to one implementation. In this embodiment, server 14 includes a processing device 22, memory device 24, input/output devices 26, and network interface 28, each interconnected via a bus 30. Network interface 28 enables communication between server 14 and each of the end-user devices 16 via network 12. Memory device 24 contains, among other things, progress tracking module 32, which may be configured to track the progress toward completion of task sets within the hierarchy.

Memory device 24 may include one or more internally fixed storage units, removable storage units, and/or remotely accessible storage units. Also, memory device 24 may include any suitable combination of volatile memory and/or non-volatile memory and can be configured to store information, data, instructions, and/or software code.

Input/output devices 26 may include input mechanisms such as keyboards, keypads, cursor control devices, or other data entry devices. The input mechanisms enable a user to enter information or instructions in end-user device 16. Input/output devices 26 may also include output mechanisms, such as computer monitors, display screens, audio output devices, printers, or other peripheral devices for communicating information to the user.

The embodiments of progress tracking module 32 described in the present disclosure can be implemented in hardware, software, firmware, or a combination thereof. When implemented in software or firmware, progress tracking module 32 can be stored in memory device 24 (as illustrated) and executed by processing device 22. Alternatively, when implemented in hardware, progress tracking module 32 can be implemented in processing device 22 using discrete logic circuitry, an application specific integrated circuit (ASIC), a programmable gate array (PGA), a field programmable gate array (FPGA), or any combination thereof.

Progress tracking module 32 and any other software applications, computer programs, or logic code that includes executable logical instructions as described herein, can be embodied in a computer-readable medium for execution by any suitable processing device. The computer-readable medium as described herein can include one or more suitable physical media components that can store the applications, programs, or code for a measurable length of time.

In particular, progress tracking module 32 includes a database for storing employee information, such as hierarchical information defining the supervisory relationships among the supervisors and subordinates of the enterprise. In many cases, an organization might be set up such that some employees may hold a supervisory role over one or more other employees while also being in a subordinate position under a higher level supervisor or manager.

Progress tracking module 32 is configured to monitor the task flow through the hierarchy. The task flow, as mentioned above, depends in these embodiments on completion of a related task by other employees, i.e., those employees who are acting in a supervisory role over a respective employee or those employees who are subordinate to the respective employee, based in part on the particular dependency scheme of the task set. In some embodiments, progress tracking module 32 may also include logic that enables the user to perform the specific tasks of which progress tracking module 32 also monitors the progress toward completion.

More specifically, progress tracking module 32 tracks the task flow to determine if there is a hold up in the flow, which may be caused by any number of reasons, such as, for example, a supervisor who does not have proper access to the task set, a supervisor who is away from the office, a supervisor who is ignoring his duties, etc. In any case, when a delay occurs, progress tracking module 32 is able to determine the one or more supervisors who are causing the delay and provide means for clearing the blockage. For instance, an e-mail can be sent to explain that the task needs to be completed, a phone call can be made to the supervisor, or other means of communication can be used.

The portion of progress tracking module 32 associated with server 14, for example, may include communication processing devices for communicating the tasks to the supervisors. For instance, the communication processing devices may send an e-mail to the supervisors, such as by using a distribution list or the like, informing the supervisors of the task or tasks to be performed and the timeframe within which the task or tasks should be performed. The portion of progress tracking module 32 associated with each end-user device 16 may include communication processing devices for receiving the instructions from server 14 to perform the tasks.

Progress tracking module 32 may be incorporated within or associated with other software applications that enable users to perform certain tasks. For example, when incorporated in a compensation program, such as Compensation Workbench from Oracle Corporation, progress tracking module 32 can allow the managers to have access to reports of the status of the task set associated with compensation reviews, without navigating to another page or application. In this respect, it may be possible to provide the functionality described herein within these other software applications without help from external sources. Thus, it can save time for an administrator to utilize the functionality described in the embodiments of the present disclosure when trying to discover who may be causing a delay and to properly act upon this information.

Figure 3:
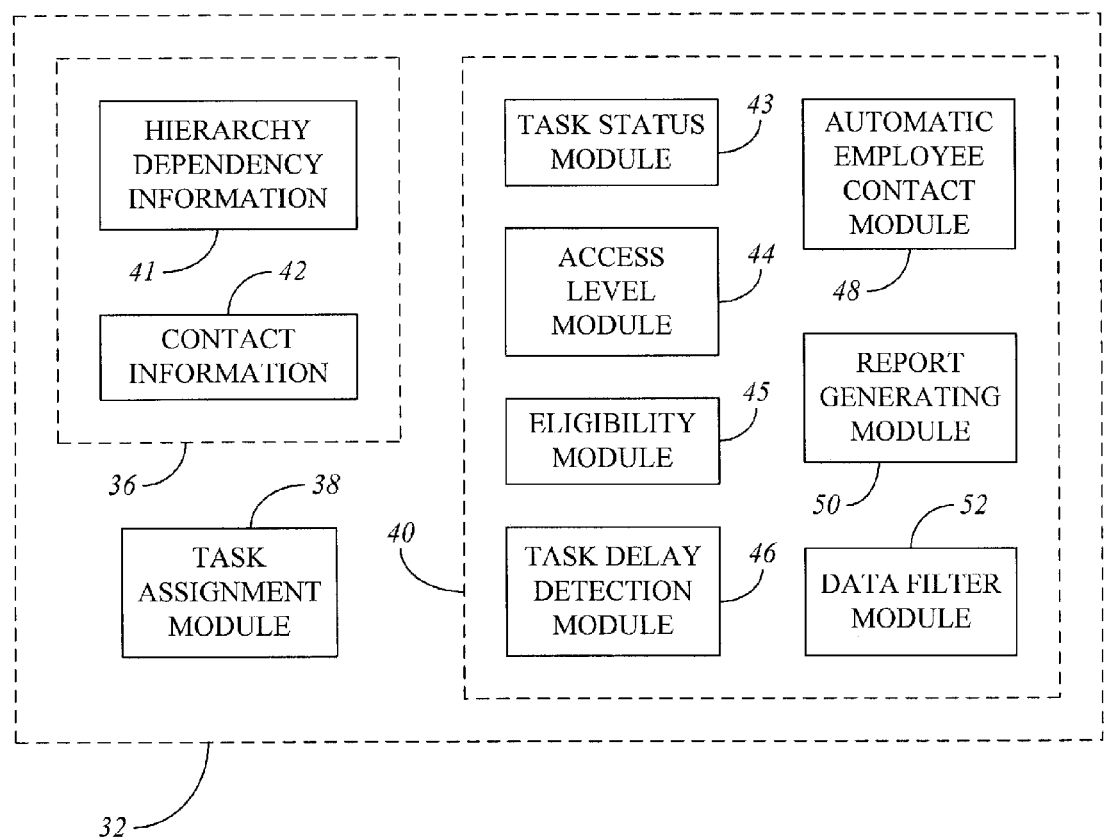
FIG. 3 is a block diagram illustrating the progress tracking module shown in FIG. 2, according to one embodiment.

FIG. 3 is a block diagram illustrating an embodiment of progress tracking module 32 shown in FIG. 2, according to one implementation. In this embodiment, progress tracking module 32 includes an employee database 36, a task assignment module 38, and a task flow progression module 40. In FIG. 3, employee database 36 includes hierarchy dependency information 41 and contact information 42. Task flow progression module 40 includes, according to this embodiment, a task status module 43, an access level module 44, an eligibility module 45, a task delay detection module 46, an automatic employee contact module 48, a report generating module 50, and a data filter module 52.

Employee database 36 may include one or more internally fixed storage units, removable storage units, and/or remotely accessible storage units and may include any suitable combination of volatile memory and/or non-volatile memory for storing the employee information. Furthermore, employee database 36 may be configured to store information in an encrypted manner to protect the stored information from access by unauthorized personnel. Hierarchy dependency information 41 includes information related to the supervisory roles of each supervisor and who reports to whom.

It should be understood that the hierarchy dependency information 41 in these embodiments do not necessarily have to follow the exact hierarchical structure of a company, such as one which may be recorded with respect to a company's human resources system. For example, in some instances, it may be desirable to create one or more hierarchy structures for tracking certain task sets, such that the hierarchy is essentially based on the particular task being performed. In this respect, one hierarchical scheme may be more advantageous to a company when one task set is performed and another may be used for another task set. The particular hierarchy dependency information can be entered by an administrator during a set-up process or can follow a predefined hierarchy already established in the organization.

For each manager, contact information 42 may include the manager's name, the manager's level in the hierarchy, the number of subordinates that report to the manager, the names of the subordinates, the manager's e-mail address, the manager's work telephone number, the manager's access level (as described in more detail below), etc. Employee database 36 may also store information regarding the current task status of each manager and a flag or other indication to record any supervisors who may be causing a delay in the progression of the task flow.

Task assignment module 38 may include logic for enabling an administrator or executive to assign a task or tasks to all the managers of an organization or to a subset of managers within the organization. In some embodiments, all of the responsible managers can be informed of the task at the same time. In other embodiments, task assignment module 38 can assign the specific tasks at different times, which may be based on the hierarchy of the particular managers, based on the completion of tasks by responsible managers on whom a particular manager relies for completion of his or her own tasks, and based on other factors.

Also, a "due date" may be associated with the task assigning process to instruct the supervisors to complete the work by a certain date. The due date can be the same for all the supervisors, or, in some cases, can be different depending on the location of the particular supervisors within the hierarchy. For example, a first line of supervisors may have an earlier due date to allow the task set to proceed on schedule. In some cases, a higher level manager may be given the option to set or change the due date for the employees under him or her. When associated with end-user device 16, according to some embodiments, task assignment module 38 can alert the user of end-user device 16 that a task needs to be performed and the due date for completing the task. Task assignment module 38 can also provide a link to a software application that enables the user to perform the assigned task.

Reference is now made to the components of task flow progression module 40, which is configured to manage status information related to the progress of task sets for which the supervisors are responsible. A first component—task status module 43—is configured to keep an updated record of the status of the level of completion of the task or tasks for each supervisor. For example, task status module 43 may record any number and type of levels of completion, such as "no activity," "information available," "work in progress," "submitted," "in approvals," "approved," "completed", and so on. In an embodiment involving a task set related to a compensation review or other budgetary review or approval, the "information available" level may be recorded as "budget available." Task status module 43 tracks the activity toward completion of the task for each manager, which can be based on the opening of tasks, the submission of information from one supervisor to another, an approval process performed by an approving supervisor, etc.

Access level module 44 is configured to detect and/or record the level of access in which each supervisor is able to operate. For example, access level module 44 can record whether or not a supervisor has been given authorization to access information resulting from completion of tasks by others. In some cases, a delay or blockage of the task flow may be caused by a supervisor not having access to needed information to complete his or her own tasks, such as if the supervisor only has view access or read-only access.

Regarding application with respect to compensation review tasks, access level module 44 may be configured to record if a manager is allowed to allocate a bonus amount to his or her employees, for example. Access level module 44 can provide an "update allowed" access level to a manager to thereby allow the manager to update a bonus amount or make changes, whereas "no update allowed" can be provided to indicate that a manager can only view, but not make, updates. "No access" can be provided to indicate that a manager cannot view the page.

In some embodiments, eligibility characteristics may be recorded for each employee based on years of service within the organization, overall experience, job definition, etc. For example, returning to the compensation allocation example, an employee may not be eligible to receive a bonus because he or she does not meet a criteria of working with the organization for a minimum amount of time, such as one year. Eligibility module 45 can record different eligibility requirements for each employee. Eligibility module 45 can also help the supervisor complete certain tasks for the employees to ensure that the eligibility characteristics for each employee affected by the completion of the manager's tasks are properly represented.

Task delay detection module 46 is configured to detect if one or more supervisors may be causing a delay in the progress of the task flow through the hierarchy. Task delay detection module 46 can show where there are "traffic jams," so to speak, in the progression toward completion of the task set. The detection of delays can be based on the lowest level hierarchy (in an upward dependent scheme) at which a supervisor has not yet submitted their work for approval. As mentioned above, the hierarchical dependency may be either upward or downward.

In an example of a downward dependent scheme, a manager may need to complete a task assigned to him, but his supervisor has not yet provided him with the required access to complete it. For example, if the manager is working on a salary allocation worksheet for his employees, but his manager has only given him view (read-only) access, he can only view but cannot submit his request. Therefore, a blockage may be detected by the lower manager, but the reason can be that he was not given proper access. When the lower manager is informed of the delay, he can contact his supervisor to ask for needed access so that action can be taken to remove the blockage and proceed with the task flow.

In some embodiments, task flow progression module 40 may include automatic employee contact module 48, as is shown in FIG. 3. In alternative embodiments, this module may be omitted. Automatic employee contact module 48 is configured to automatically send a message to a supervisor or supervisors who may be causing a delay. This delay, as explained above, can be detected by task delay detection module 46. The automatic message may be in the form of an automatic e-mail sent to the delayer to inform the employee that there is a delay, that the employee should attempt to complete the assigned tasks, that there is an upcoming due date or deadline, etc. In another example, automatic employee contact module 48 may send an automated telephone message to inform the delayer of the delay.

Report generating module 50 is configured to generate a report of the task status of each manager, the access level detected for each manager, any delays that may have been detected, etc. Report generating module 50 may present this information on a display device associated with end-user device 16 or server 14. The managers can access this report to view an updated status of the progress towards completion of the set of tasks assigned to the managers. In some embodiments, report generating module 50 may be configured to display charts, tables, etc., in any format, such as on a user interface where a user can control the display to some extent. For example, the screen shots illustrated in FIGS. 5-8, as described in more detail below, may be associated with report generating module 50.

Furthermore, task flow progression module 40 includes data filter module 52, which can be configured to enable the user to filter the data presented on the report from report generating module 50. Data filter module 52 therefore allows the user to focus in on portions of the report that may be most pertinent to the user, allowing the user to control the format of the report shown on the user interface.

Figure 4:
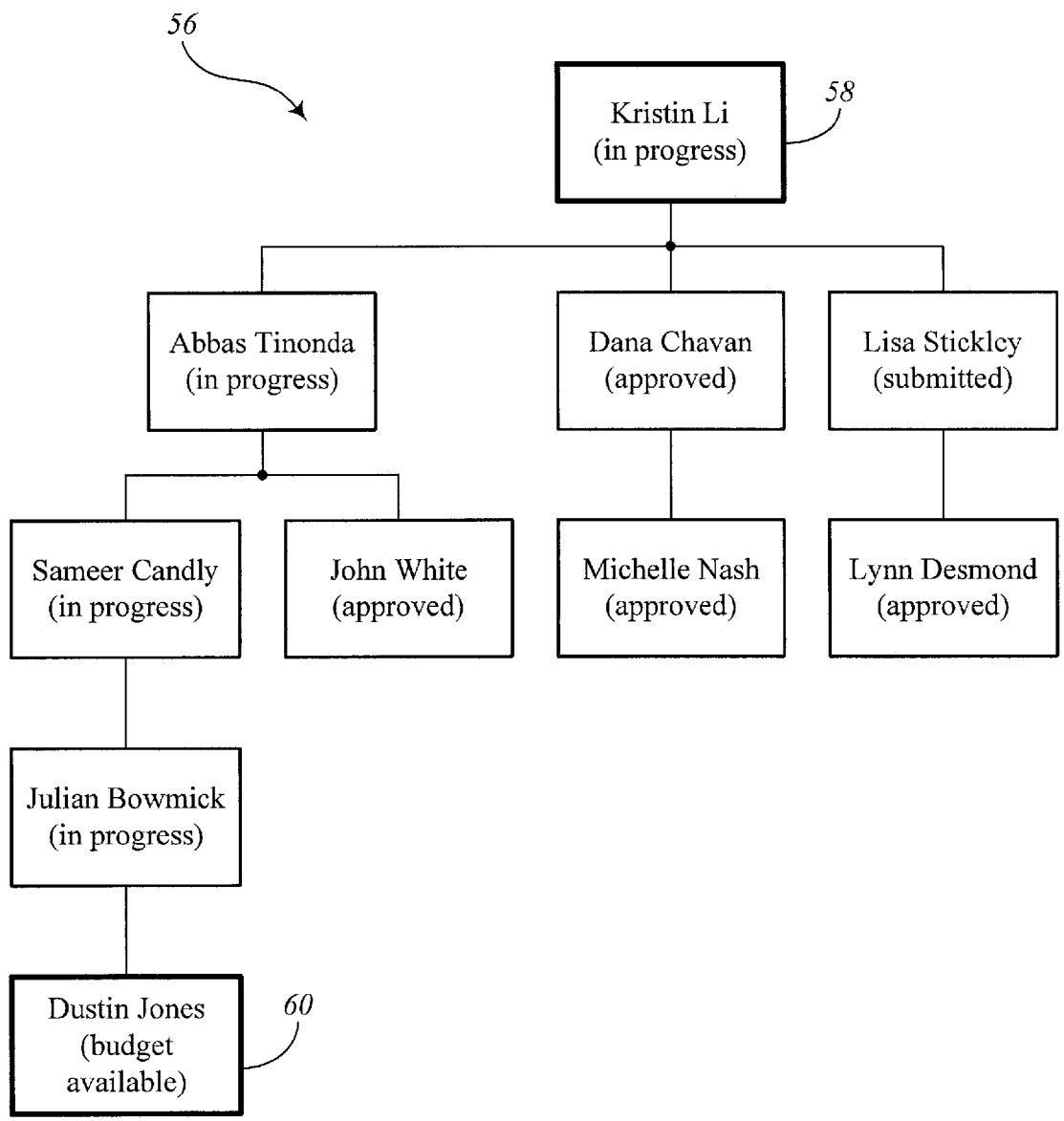
FIG. 4 is a diagram illustrating an example of a hierarchical chart according to one embodiment.

FIG. 4 is a diagram illustrating an example of a hierarchical chart 56, or a portion of a hierarchical chart, of an organization, according to one implementation. In this example, hierarchical chart 56 shows a block 58 representing a supervisor "Kristin Li" who is at a top level of this particular hierarchy. The task status of this employee is determined to be "in progress." However, an employee four levels down from Kristin Li 58 is represented by block 60 for an employee Dustin Jones, for example. In this case, the status of the completion of the task for this employee is recorded as "budget available," which means that this employee has the needed budget information available to complete his assigned task, but no further progress has been made. Particularly, this status may be representative of a budgetary review, such as a compensation review. In this case, Dustin Jones 60 has not started the task, which would move the task status to the "in progress" or "work in progress" level. Later on than this, the status may eventually reach higher levels of the task flow, such as "submitted for approval," "in approvals," "approved," "completed," etc.

Therefore, in this example, it can be determined that the delay or blockage in the progression of the task flow can be directed to Dustin Jones 60. This blockage causes upper level managers to have to wait to complete their tasks until Dustin completes his. Dustin's supervisor, Julian Bowmick in this case, can determine or be informed that her subordinate may be causing a delay. Therefore, if an automatic message is not provided to Dustin Jones directly, then Julian Bowmick may contact Dustin to inform him of the delay and to see what may be causing the blockage. Hierarchical chart 56 can be a simple example of just a portion of a larger network of managers. For instance, an organization may have a greater number of managers and many more managerial levels within the hierarchy.

Figure 5:
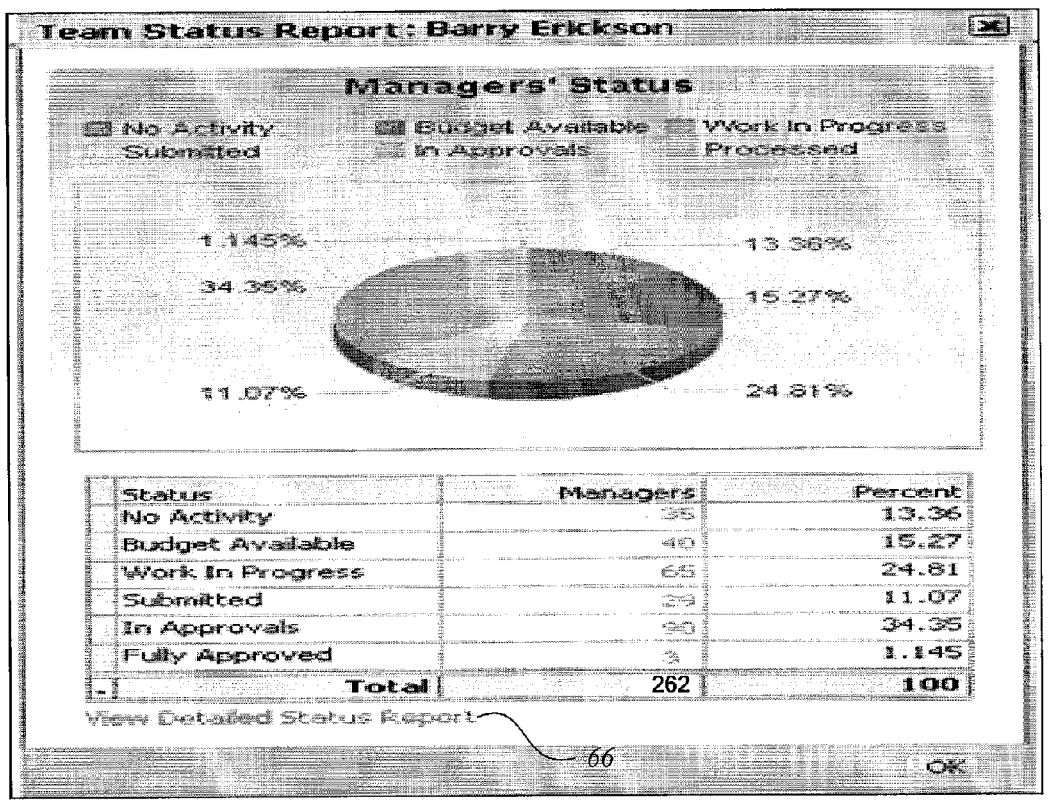
FIG. 5 is a diagram of a screen shot showing a status report according to a first embodiment.

FIG. 5 is a diagram of a screen shot showing a status report 64 according to a first embodiment. Status report 64 can be accessed by the managers within the particular hierarchy and even administrators who may be responsible for overseeing the completion of the task set. In this respect, the administrator may not necessarily be responsible for actually performing any tasks in the task set, but may be responsible for managing the progress. In this view, status report 64 shows the status of managers' activity for a group of managers of a team. Specifically, in this example, the team status report is for a team headed by Barry Erickson. The supervisor accessing this status report 64 in this example should be able to see that there are certain numbers of managers at each task status level and the respective percentages of the managers at these levels. These numbers are shown in a pie chart format and in a regular chart format.

Figure 6:
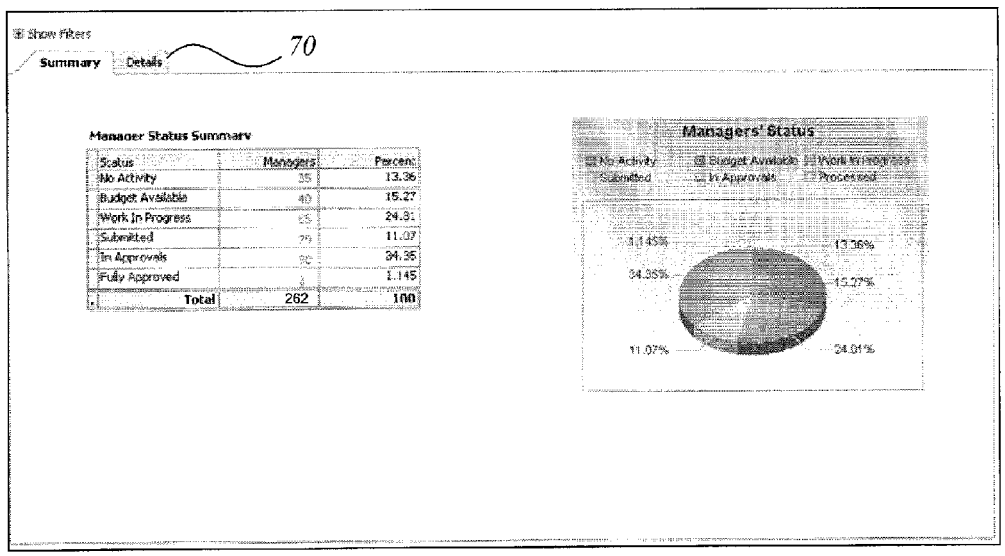
FIG. 6 is a diagram of a screen shot showing a status report according to a second embodiment.

FIG. 6 is a diagram of a screen shot showing a status report 68 according to a second embodiment. In this embodiment, status report 68 shows substantially the same information as in FIG. 5, but in a different configuration. From the views shown in FIGS. 5 and 6, the user can access a view of a detailed status report by selecting a "View Detailed Status Report" link 66 as shown in FIG. 5, selecting a "Details" sub-tab 70 as shown in FIG. 6, clicking a portion of either one of status reports 64 or 68, or by using any other suitable selection technique or feature of the user interfaces.

Figures 7, 8:
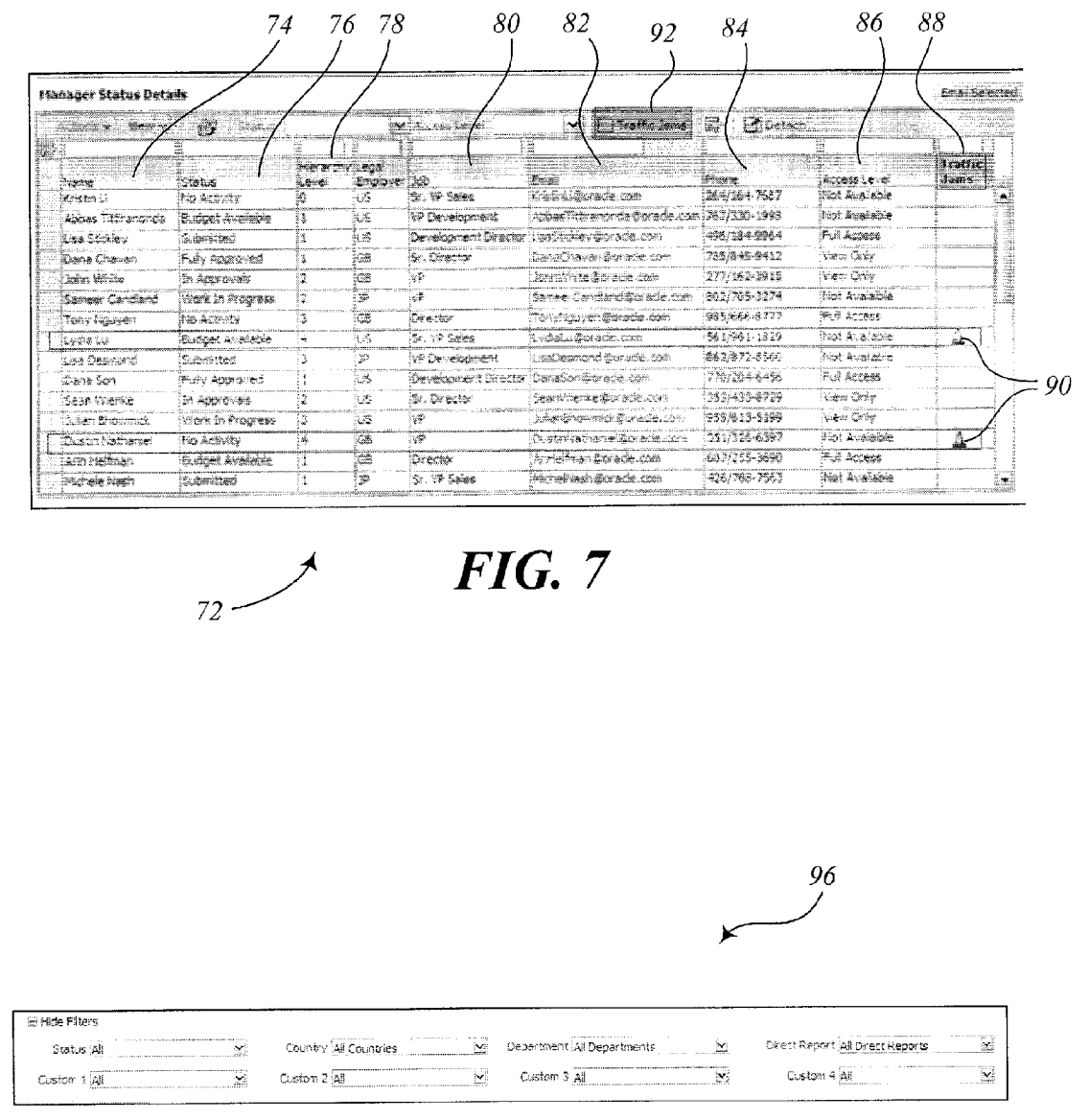

FIG. 7 is a diagram of an example of a screen shot 72 showing status details according to one implementation, which may be called up in response to the request to view a detailed status report. Status details screen shot 72 in this embodiment includes a chart having a name column 74, a status column 76, a hierarchy level column 78, a job column 80, an e-mail column 82, a phone number column 84, an access level column 86, and a traffic jams column 88. The chart can also have a legal employer column. Name column 74 shows the name of each supervisor in the hierarchy. Information for the manager's name, e-mail address, phone number, etc. may be stored in employee database 36 (FIG. 3). Also, other information, such as hierarchy level job and access level, can be stored in employee database 36 or determined from task flow progression module 40 (FIG. 3).

Based on the status level shown in status column 76, it can be determined who may be causing a delay in the progression toward completion of the tasks for the group of managers. Also, the hierarchy level shown in hierarchy level column 78 indicates where the managers fit within the hierarchy.

In a bottom-up task flow, or upward dependency scheme, the managers at the lower levels in the hierarchy, which are represented by a higher number in hierarchy level column 78, are responsible for completing the task before managers in the higher levels. In this type of scheme, a delay can be detected by an employee who shows a "no activity" status, "information available" status, "budget available" status, or other similar low level of task completion status in status column 76, and who shows a high number in hierarchy level column 78.

In a top-down task flow, or downward dependency scheme, the managers at the upper levels in the hierarchy, which are represented by a lower number in hierarchy level column 78, are responsible for completing the task before managers in the lower levels. In this type of scheme, a delay can be detected by an employee who shows a "no activity" status in status column 76 and who shows a low number in hierarchy level column 78.

The user may choose to see where a delay may exist by selecting a traffic jams selector 92, which may be configured as a check box, button, or other suitable interface. In response to selection of traffic jams selector 92, task flow progression module 40 (FIG. 3) may be configured to determine who may be causing a delay or traffic jam. In an upward dependency scheme as illustrated in the example of FIG. 7, it is determined that Lydia Lu and Dustin Nathaniel may be causing a delay. Particularly, these employees have a status, as indicated in column 76, of "budget available" and "no activity," respectively. Also, these employees are both low in the hierarchy, represented by larger numbers, i.e., 4 in this example, in hierarchy level column 78. When the possible sources of the delay are determined, an icon 90, which may be in the form of a traffic cone, hour glass, wristwatch, or other suitable symbol, is displayed in traffic jams column 88. Thus, the user can easily view icons 90 to discover who may be responsible for holding up the progression of the set of tasks for the hierarchy.

In some embodiments, automatic employee contact module 48 (FIG. 3) may automatically contact the employees who seem to be delaying the process, such as by e-mail or by a pre-recorded telephone message. In other embodiments in which automatic employee contact module 48 is not implemented, screen shot 72 of FIG. 7 can display the report to a particular user in order that he may view the report of the activity levels and icons 90 in traffic jams column 88 to see where the blockages may be. In this case, the user, who may be a supervisor who supervises the delaying employee or an administrator, can easily see the contact information of the delaying employee, which screen shot 72 shows in columns 82 and 84. Thus, the user can contact the delayer to find out what may be causing the delay. In some embodiments, the user can click on the appropriate phone number in phone number column 84 to automatically place a call or click on the appropriate e-mail address in e-mail column 82 to automatically create a new e-mail with the delaying supervisor's e-mail address automatically listed in the "to:" line.

FIG. 8 is a diagram illustrating a user interface 96 for enabling a user to filter status details according to one embodiment. In some cases, the number of employees displayed on status details screen shot 72 of FIG. 7 may be too large for the viewer to see the relevant details for a user's particular interests. If this is the case, then the list of employees can be filtered down to a more reasonable number. For example, the user can narrow down the group of supervisors based on the supervisors' task status, supervisors' country of employment, supervisors' department, etc. In other embodiments, the results can be filtered based on other criteria, such as hierarchy level, job, time of delay, etc. Also, in some cases, a user can filter the list down to only those employees who are in the direct chain of command as the user. The chain of command may include both those employees who are direct subordinates to the user and the direct supervisor of the user. This filter can also include the next one or more levels up and/or down the hierarchy of the chain of command for the user's subordinates and supervisor.

Figure 9:
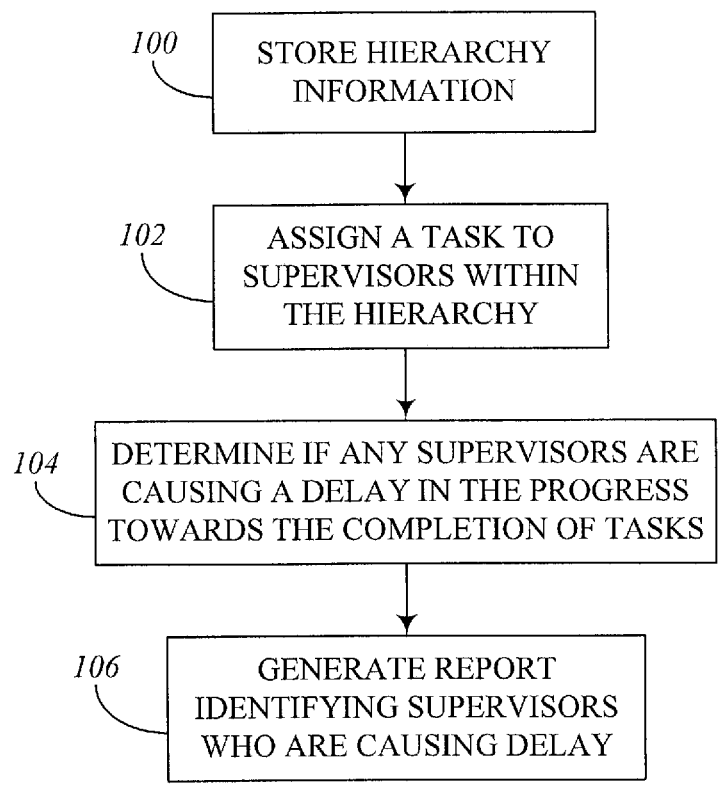
FIG. 9 is a flow diagram illustrating a method for monitoring the progress of a set of tasks to be performed by supervisors within a hierarchy, according to one embodiment.

FIG. 9 is a flow diagram illustrating an embodiment of a method of tracking of progress made toward completion of a set of tasks within the hierarchy of an enterprise. The method relates to tracking the progress of an entire task set, which requires each manager in the hierarchy to complete his or her respective task of the task set. In this respect, a task can only be performed by a respective employee at one level when the employees related as either the supervisor or subordinates of the employee at a next level up or next level down, respectively, from the employee have already completed the particular task for which they are responsible. Hence, the respective employee relies on other responsible people and can only perform his particular task when the people on which the respective employee relies have completed the task.

As indicated in block 100, hierarchy information is stored. The hierarchy information can include the relationships among the employees of the enterprise with respect to supervisory and subordinate roles. As indicated in block 102, a task is assigned to the supervisors within the hierarchy. The supervisors may have subordinates who are supervisors as well. Also, going up the hierarchy, a supervisor usually has at most one other supervisor. The assigned tasks may be related, for example, to tasks associated with a compensation review for determining an appropriate compensation plan for one or more employees. As mentioned above, the tasks are hierarchically dependent, either in an upward or downward dependency manner. The dependency refers to the reliance on the direct subordinates (in an upward dependency scheme) or the direct supervisor (in an downward dependency scheme) to complete their respective tasks in order to proceed with the assigned tasks. The direct subordinates and direct supervisors may be defined as the employees at the next level down and next level up, respectively, in the chain of command within the hierarchy.

The method of FIG. 9 further includes determining if any supervisors are causing a delay in the progress toward the completion of the task set, as indicated in block 104. A report is then generated, as indicated in block 106, to identify those supervisors who are causing the delay. The method may also include contacting the delaying supervisors, such as by an e-mail or phone, to indicate that the progress has been stalled and the respective tasks need to be completed to continue the task flow. The process of contacting the delaying person may be an automatic message via e-mail or an automatic prerecorded telephone call to the person. In other implementations, the report may include contact information that can enable one viewing the report to send an e-mail or place a telephone call so that action can be taken to remove the blockage.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A computer readable medium configured to store instructions that are executable by a processing device, the computer readable medium comprising:
   logic adapted to store information that defines a hierarchy within an enterprise, the hierarchy including a tree structure where each of a plurality of supervisors is placed in a supervisory position over one or more subordinates and each supervisor is subordinate to at most one other supervisor, wherein each element of the tree structure is an identity of an employee of the enterprise;
   logic adapted to assign a task for each of the plurality of supervisors to perform, wherein performing the task by a first supervisor depends in part on completion of the task by each of the one or more respective subordinates;
   logic adapted to determine if one or more subordinates are causing a delay in the progress towards completion of the task within the hierarchy based on the tree structure; and
   logic adapted to generate a report identifying the subordinates, if any, who are causing a delay in the task completion progress;
   wherein the information that defines the hierarchy within the enterprise is stored in a human resources system of the enterprise.

2. The computer readable medium of claim 1, wherein the task to be performed by each supervisor is an employee review.

3. The computer readable medium of claim 2, wherein the employee review is a compensation review to determine an appropriate compensation plan for a respective employee based in part on the employee's performance and work experience, and wherein the compensation review is part of a compensation managing software application.

4. The computer readable medium of claim 1, wherein the logic adapted to generate the report is further adapted to provide contact information for the subordinates, if any, who are causing the delay.

5. The computer readable medium of claim 1, further comprising logic adapted to automatically send an e-mail to the subordinates, if any, who are causing the delay to inform the delaying subordinates about the delay.

6. The computer readable medium of claim 5, wherein the logic adapted to automatically send the e-mail is further adapted to inform the delaying subordinates about a timeframe for completing the task.

7. The computer readable medium of claim 1, further comprising logic adapted to assign each supervisor to review the tasks completed by the one or more subordinates for approval.

8. The computer readable medium of claim 1, further comprising logic adapted to monitor the status of the assigned task for each supervisor.

9. The computer readable medium of claim 8, wherein the logic adapted to generate the report is further adapted to display the task status for each supervisor.

10. The computer readable medium of claim 1, further comprising logic adapted to determine an access level for each supervisor defining the level of access of information associated with the assigned task, wherein the logic adapted to generate the report is further adapted to display the access level for each supervisor.

11. The computer readable medium of claim 1, wherein the logic adapted to generate the report comprises logic adapted to enable a user to filter information in the report.

12. The computer readable medium of claim 1, wherein the logic adapted to generate the report is further adapted to display each supervisor's name and at least one of the supervisor's level in the hierarchy, workers subordinate to the supervisor, job title, e-mail address, and work phone number.

13. A system comprising:
a memory device configured to store a progress tracking module;
a processing device in communication with the memory device, the processing device configured to execute the progress tracking module stored in the memory device;
the progress tracking module comprising:
an employee database configured to store hierarchy information of an enterprise, the hierarchy information including the relationship among a plurality of supervisors and subordinates, wherein the hierarchy information comprises a tree structure, each element of the tree structure is an identity of an employee of the enterprise, and the employee database is part of a human resources system of the enterprise;
a task flow progression module configured to cause the processing device to determine if any supervisors or subordinates assigned to perform a certain task within a certain timeframe are delaying, based on the tree structure, wherein completion of the task by each of one or more of the supervisors or subordinates in a next level with respect to a respective employee and within a direct chain of command as the respective employee allows the employee to perform the task;
wherein the task flow progression module is further configured to cause the processing device to create a report identifying which ones of the supervisors, if any, are causing a delay in a progression towards the completion of the tasks for other employees in the chain of command of the supervisor or subordinate who rely on completion of the supervisors, if any, who are causing the delay.

14. The system of claim 13, wherein the task to be performed by each supervisor or subordinate is a compensation review to determine an appropriate compensation plan for a respective employee based in part on the employee's performance and work experience, and wherein the compensation review is part of a compensation managing software application.

15. The system of claim 13, wherein the task flow progression module is further configured to cause the processing device to provide information about the supervisors, if any, who are causing the delay, the information including each supervisor's name and at least one of a level in the hierarchy, a job title, an e-mail address, a work phone number, and a list of subordinates.

16. The system of claim 13, wherein progression towards the completion of the task by the plurality of supervisors and subordinates proceeds in an upward direction through the hierarchy such that a respective supervisor is allowed to perform the task when each of the one or more subordinates in the level below the respective supervisor and within a direct chain of command as the respective supervisor completes the task.

17. The system of claim 13, wherein progression of completion of the task by the plurality of supervisors and subordinates proceeds in a downward direction through the hierarchy such that a respective subordinate is allowed to perform the task when the supervisor, if any, in the level above the respective subordinate and within a direct chain of command as the respective subordinate completes the task.

18. A computer implemented method comprising:
storing hierarchy information of an enterprise, the hierarchy information including a chain of command relationship among a plurality of employees of the enterprise, wherein the hierarchy information comprises a tree structure, and each element of the tree structure is an identity of an employee of the enterprise;
assigning related tasks to each supervisor within the hierarchy, wherein performing the task by a respective employee depends at least on completion of the task by a direct supervisor or direct subordinate of the respective employee;
determining based on the tree structure if any employees are causing a delay in a progress towards the completion of the related tasks; and
generating a report identifying which employees, if any, are causing a delay;
wherein hierarchy information is stored in a human resources system of the enterprise.

19. The computer implemented method of claim 18, wherein assigning the related tasks further comprises assigning a compensation review task to determine an appropriate compensation plan for an employee based in part on the employee's performance and work experience.

20. The computer implemented method of claim 19, wherein the computer implemented method further comprises automatically sending an e-mail to the employees, if any, who are causing the delay to instruct the employees to complete the task.

* * * * *

UNITED STATES PATENT AND TRADEMARK OFFICE
CERTIFICATE OF CORRECTION

| | | |
|---|---|---|
| PATENT NO. | : 8,571,906 B2 | Page 1 of 2 |
| APPLICATION NO. | : 12/431027 | |
| DATED | : October 29, 2013 | |
| INVENTOR(S) | : Upadhyaya et al. | |

It is certified that error appears in the above-identified patent and that said Letters Patent is hereby corrected as shown below:

On the Title Page

In column 2, line 11, in Item (57) Abstract, delete "sub ordinate" insert -- subordinate --.

In the Claims

In column 12, line 23, in Claim 1, before "computer" insert -- non-transitory --.

In column 12, line 34, in Claim 1, after "wherein" insert -- the task is a hierarchically dependent task, and --.

In column 12, line 35, in Claim 1, delete "the" and insert -- a subordinate --, therefor.

In column 12, line 39, in Claim 1, before "task" insert -- hierarchically dependent --.

In column 12, line 39, in Claim 1, delete "structure;" and insert -- structure --, therefor.

In column 12, line 40, in Claim 1, after "and" insert -- a status of the respective subordinate tasks; and --.

In column 12, line 43, in Claim 1, delete "progress;" and insert -- progress, --, therefor.

In column 12, line 44, in Claim 1, after "wherein" insert -- the delays in the task completion progress are caused by the subordinates not completing their respective subordinate tasks, and --.

In column 13, line 41, in Claim 13, delete "certain" and insert -- hierarchically dependent --, therefor.

In column 13, line 42-43, in Claim 13, after "delaying," delete "based on the tree structure,".

Signed and Sealed this
Third Day of June, 2014

Michelle K. Lee
*Deputy Director of the United States Patent and Trademark Office*

CERTIFICATE OF CORRECTION (continued)
U.S. Pat. No. 8,571,906 B2

In column 13, line 43, in Claim 13, delete "the" and insert -- a next level --, therefor.

In column 13, line 47, in Claim 13, before "task;" insert -- hierarchically dependent task, and wherein the determining is based on the tree structure and a status of at least one next level --.

In column 13, line 52, in Claim 13, before "tasks" insert -- hierarchically dependent --.

In column 13, line 53, in Claim 13, delete "supervisor or subordinate who rely on" and insert -- supervisor, wherein the delays in the progression towards the --, therefor.

In column 13, line 54, in Claim 13, delete "of the supervisors, if any, who are causing the delay." and insert -- of the hierarchically dependent tasks are caused by the supervisors not completing their respective tasks. --, therefor.

In column 13, line 55, in Claim 14, before "task" insert -- hierarchically dependent --.

In column 14, line 14, in Claim 16, before "task" insert -- hierarchically dependent --.

In column 14, line 19, in Claim 16, delete "the" and insert -- their respective --, therefor.

In column 14, line 21, in Claim 17, before "task" insert -- hierarchically dependent --.

In column 14, line 27, in Claim 17, delete "the" and insert -- their respective --, therefor.

In column 14, line 29, in Claim 17, delete "storing" and insert -- storing, --, therefor.

In column 14, line 37, in Claim 18, delete "the" and insert -- a next level --, therefor.

In column 14, line 40, in Claim 18, delete "determining" and insert -- determining, by a computer system, --, therefor.

In column 14, line 40, in Claim 18, after "structure" insert -- and a status of at least one next level task --.

In column 14, line 42, in Claim 18, delete "tasks;" and insert -- tasks, the related tasks including at least one hierarchically dependent task; --, therefor.

In column 14, line 43, in Claim 18, delete "generating" and insert -- generating, by the computer system, --, therefor.

In column 14, line 44, in Claim 18, delete "delay;" and insert -- delay in the progress towards the completion of the related tasks --, therefor.

In column 14, line 45, in Claim 18, after "wherein" insert -- the delays are caused by the employees not completing their respective tasks, and the --.